US012657146B2

(12) United States Patent
Sodke et al.

(10) Patent No.: US 12,657,146 B2
(45) Date of Patent: Jun. 16, 2026

(54) SWITCHING DATA BASED ON A BUS IDENTIFIER AND A DEVICE IDENTIFIER

(71) Applicant: Microchip Technology Incorporated, Chandler, AZ (US)

(72) Inventors: Richard David Sodke, Kelowna (CA); Vincent Hache, Vancouver (CA)

(73) Assignee: Microchip Technology Incorporated, Chandler, AZ (US)

( * ) Notice: Subject to any disclaimer, the term of this patent is extended or adjusted under 35 U.S.C. 154(b) by 0 days.

(21) Appl. No.: 18/166,978

(22) Filed: Feb. 9, 2023

(65) Prior Publication Data

US 2023/0251990 A1     Aug. 10, 2023

Related U.S. Application Data

(60) Provisional application No. 63/267,771, filed on Feb. 9, 2022.

(51) Int. Cl.
*G06F 13/40*          (2006.01)

(52) U.S. Cl.
CPC .. *G06F 13/4022* (2013.01); *G06F 2213/0026* (2013.01)

(58) Field of Classification Search
CPC .................... G06F 13/4022; G06F 2213/0026
See application file for complete search history.

(56) References Cited

U.S. PATENT DOCUMENTS

| | | | |
|---|---|---|---|
| 7,120,931 B1 * | 10/2006 | Cheriton | ............. H04L 63/0227 726/13 |
| 9,280,508 B1 | 3/2016 | Tabor et al. | |
| 9,753,880 B1 | 9/2017 | Sodke et al. | |
| 9,880,949 B1 | 1/2018 | Hanchinal et al. | |
| 10,114,790 B2 | 10/2018 | Hanchinal et al. | |
| 2006/0136639 A1 * | 6/2006 | Futral | ................. G06F 13/4291 710/244 |
| 2006/0242333 A1 * | 10/2006 | Johnsen | ................. H04L 45/00 710/30 |
| 2008/0137677 A1 * | 6/2008 | Boyd | .................... G06F 13/385 370/419 |

(Continued)

FOREIGN PATENT DOCUMENTS

WO          2022/012309 A1     1/2022

OTHER PUBLICATIONS

International Search Report for International Application No. PCT/US2023/062317, mailed Nov. 6, 2023, 5 pages.

(Continued)

*Primary Examiner* — Henry Tsai
*Assistant Examiner* — Harry Z Wang
(74) *Attorney, Agent, or Firm* — TraskBritt

(57) ABSTRACT

One or more examples relate to an apparatus to switch data based on a bus identifier and a device identifier. Such an apparatus may include an upstream port for a respective peripheral component interconnect express (PCIe)-compliant communicative connection with a host; a downstream port for a respective PCIe-compliant communicative connection with an endpoint; and a switching logic. The switching logic may store a bus identifier and a device identifier for the endpoint; and switch data at least partially responsive to the bus identifier and the device identifier of the endpoint.

30 Claims, 9 Drawing Sheets

(56)          References Cited

U.S. PATENT DOCUMENTS

| | | | |
|---|---|---|---|
| 2009/0164694 | A1 | 6/2009 | Talayco et al. |
| 2016/0188511 | A1* | 6/2016 | Muraoka ............. G06F 13/4282 |
| | | | 710/110 |
| 2016/0217094 | A1* | 7/2016 | Yokoyama .......... G06F 13/4295 |
| 2016/0267035 | A1* | 9/2016 | Murphy ................ G06F 13/368 |
| 2017/0177528 | A1* | 6/2017 | Harriman ............ G06F 13/4282 |
| 2017/0185525 | A1* | 6/2017 | Kutuva Rabindranath ................. |
| | | | G06F 12/109 |
| 2017/0255582 | A1* | 9/2017 | Harriman ............ G06F 13/4022 |
| 2018/0052793 | A1* | 2/2018 | Fang ................... H04L 41/0806 |
| 2022/0239763 | A1 | 7/2022 | Li et al. |
| 2022/0400089 | A1 | 12/2022 | Hache |

OTHER PUBLICATIONS

International Written Opinion for International Application No. PCT/US2023/062317, mailed Nov. 6, 2023, 8 pages.
PCI Express® Base Specification Revision 5.0, Version 1.0, PCI-SIG, May 22, 2019, 1299 pages.

* cited by examiner

STORE A BUS IDENTIFIER AND A DEVICE IDENTIFIER FOR AN ENDPOINT DIRECTLY CONNECTED TO A DOWNSTREAM PORT OF A SWITCH THROUGH A PCIe-COMPLIANT CONNECTION 702
SWITCH DATA VIA THE UPSTREAM PORT AND THE DOWNSTREAM PORT OF THE SWITCH AT LEAST PARTIALLY RESPONSIVE TO THE BUS IDENTIFIER AND THE DEVICE IDENTIFIER OF THE ENDPOINT 704
FIG. 7

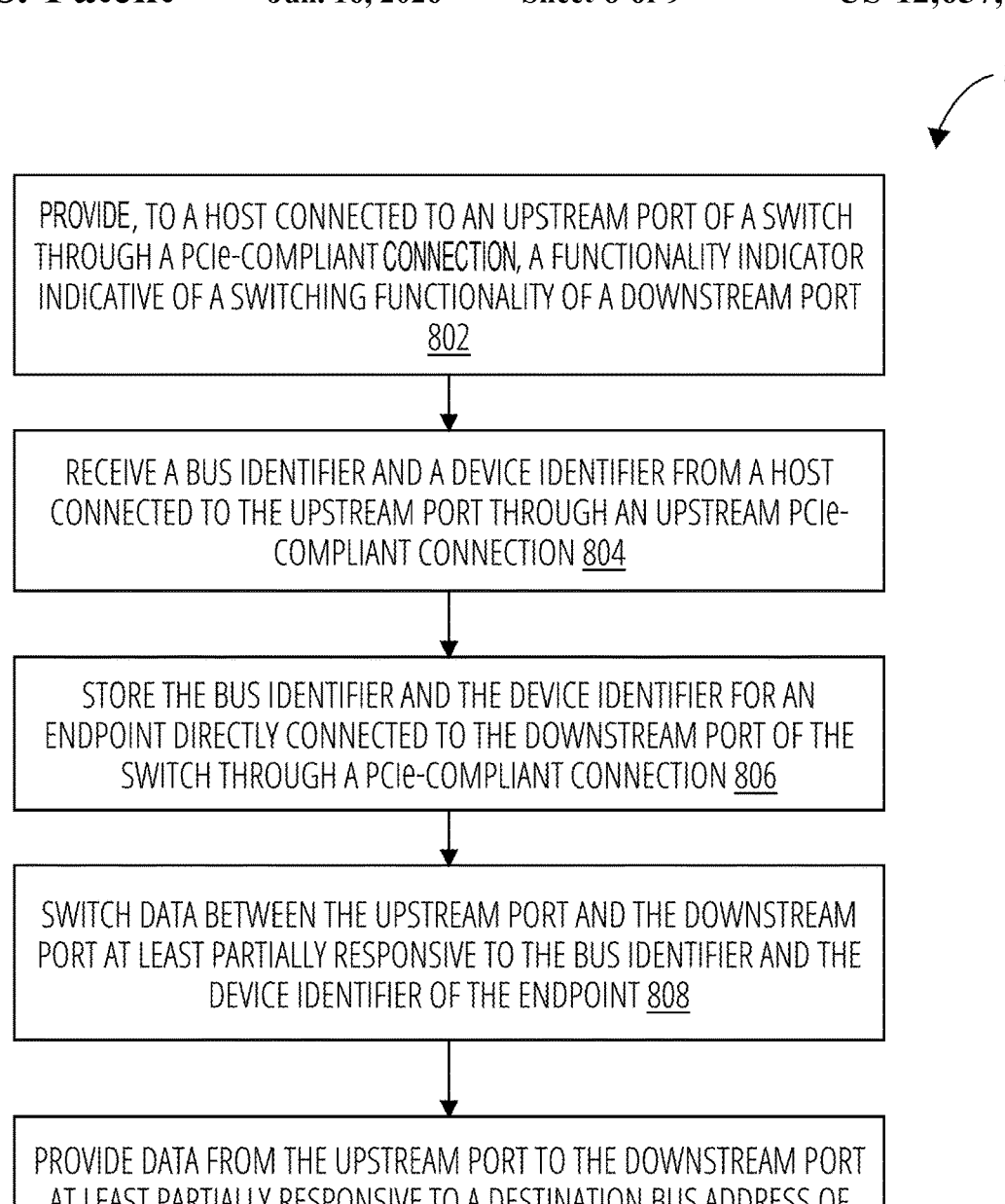

PROVIDE, TO A HOST CONNECTED TO AN UPSTREAM PORT OF A SWITCH THROUGH A PCIe-COMPLIANT CONNECTION, A FUNCTIONALITY INDICATOR INDICATIVE OF A SWITCHING FUNCTIONALITY OF A DOWNSTREAM PORT
802

RECEIVE A BUS IDENTIFIER AND A DEVICE IDENTIFIER FROM A HOST CONNECTED TO THE UPSTREAM PORT THROUGH AN UPSTREAM PCIe-COMPLIANT CONNECTION 804

STORE THE BUS IDENTIFIER AND THE DEVICE IDENTIFIER FOR AN ENDPOINT DIRECTLY CONNECTED TO THE DOWNSTREAM PORT OF THE SWITCH THROUGH A PCIe-COMPLIANT CONNECTION 806

SWITCH DATA BETWEEN THE UPSTREAM PORT AND THE DOWNSTREAM PORT AT LEAST PARTIALLY RESPONSIVE TO THE BUS IDENTIFIER AND THE DEVICE IDENTIFIER OF THE ENDPOINT 808

PROVIDE DATA FROM THE UPSTREAM PORT TO THE DOWNSTREAM PORT AT LEAST PARTIALLY RESPONSIVE TO A DESTINATION BUS ADDRESS OF THE DATA MATCHING A BUS IDENTIFIER OF THE ENDPOINT AND AT LEAST PARTIALLY RESPONSIVE TO A DESTINATION DEVICE ADDRESS OF THE DATA MATCHING A DEVICE IDENTIFIER OF THE ENDPOINT 810

PROVIDE DATA FROM THE DOWNSTREAM PORT TO THE UPSTREAM PORT, THE DATA INCLUDING A SOURCE BUS ADDRESS MATCHING A BUS IDENTIFIER OF THE ENDPOINT AND A SOURCE DEVICE ADDRESS MATCHING A DEVICE IDENTIFIER OF THE ENDPOINT 812

FIG. 8

SWITCHING DATA BASED ON A BUS IDENTIFIER AND A DEVICE IDENTIFIER

CROSS-REFERENCE TO RELATED APPLICATION

This application claims the benefit of the priority date of U.S. Provisional Patent Application No. 63/267,771, filed Feb. 9, 2022, and titled "COMPRESSING PCLE BUS ASSIGNMENT IN LARGE SWITCH TOPOLOGIES," the disclosure of which is incorporated herein in its entirety by this reference.

FIELD

This description relates, generally, to switching data at least partially responsive to a bus identifier and a device identifier. More specifically, some examples relate to a switching data between peripheral-component interconnect express (PCIe)-compliant ports at least partially responsive to a bus identifier and a device identifier, without limitation.

BACKGROUND

The PCIe specification defines operations for devices connected by PCIe-compliant connections. In the present disclosure, the term "PCIe specification" may refer to any revision and/or version of the PCI Express Base Specification published by the Peripheral Component Interconnect Special Interest Group (PCI-SIG). As a non-limiting example, the term PCIe specification may refer to "PCI Express Base Specification Revision 6.0, Version 1.0" published Jan. 11, 2022, without limitation. In the present disclosure, the term "PCIe-compliant," with reference to ports, connections, and/or devices may refer to ports, connections, and/or devices, respectively that are capable of communicating according to the PCIe specification, without limitation.

The PCIe specification defines a bus:device.function number format for identifying ports and devices. According to the PCIe specification, data may be switched according to bus numbers, i.e., the bus portion of the bus:device.function number.

BRIEF DESCRIPTION THE DRAWINGS

While this disclosure concludes with claims particularly pointing out and distinctly claiming specific examples, various features and advantages of examples within the scope of this disclosure may be more readily ascertained from the following description when read in conjunction with the accompanying drawings, in which:

FIG. 7 is a flowchart of a method, according to one or more examples.

FIG. 8 is a flowchart of a method, according to one or more examples.

DETAILED DESCRIPTION

Figure 1:
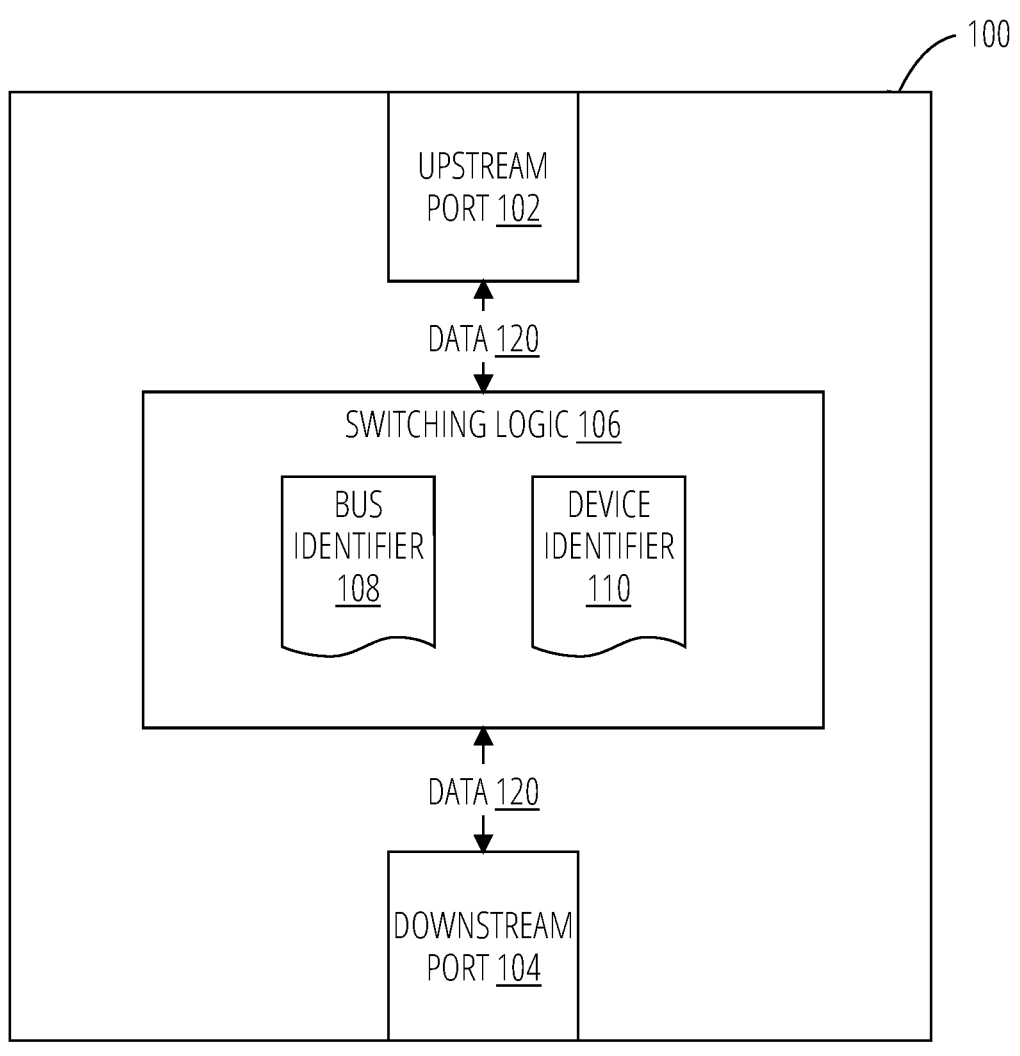
FIG. 1 is a functional block diagram illustrating a device according to one or more examples.

In the following detailed description, reference is made to the accompanying drawings, which form a part hereof, and in which are shown, by way of illustration, specific examples in which the present disclosure may be practiced. These examples are described in sufficient detail to enable a person of ordinary skill in the art to practice the present disclosure. However, other examples may be utilized, and structural, material, and process changes may be made without departing from the scope of the disclosure.

The illustrations presented herein are not meant to be actual views of any particular method, system, device, or structure, but are merely idealized representations that are employed to describe the examples of the present disclosure. The drawings presented herein are not necessarily drawn to scale. Similar structures or components in the various drawings may retain the same or similar numbering for the convenience of the reader; however, the similarity in numbering does not mean that the structures or components are necessarily identical in size, composition, configuration, or any other property.

The following description may include examples to help enable one of ordinary skill in the art to practice the disclosed examples. The use of the terms "exemplary," "by example," and "for example," means that the related description is explanatory, and though the scope of the disclosure is intended to encompass the examples and legal equivalents, the use of such terms is not intended to limit the scope of an example of this disclosure to the specified components, steps, features, functions, or the like.

It will be readily understood that the components of the examples as generally described herein and illustrated in the drawing could be arranged and designed in a wide variety of different configurations. Thus, the following description of various examples is not intended to limit the scope of the present disclosure, but is merely representative of various examples. While the various aspects of the examples may be presented in drawings, the drawings are not necessarily drawn to scale unless specifically indicated.

Furthermore, specific implementations shown and described are only examples and should not be construed as the only way to implement the present disclosure unless specified otherwise herein. Elements, circuits, and functions may be depicted by block diagram form in order not to obscure the present disclosure in unnecessary detail. Conversely, specific implementations shown and described are only examples and should not be construed as the only way to implement the present disclosure unless specified otherwise herein. Additionally, block definitions and partitioning of logic between various blocks is an example of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art would understand that information and signals may be represented using any of a variety of different technologies and techniques. For example, data, instructions, commands, information, signals, bits, and symbols that may be referenced throughout this description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal. A person having ordinary skill in the art would appreciate that this disclosure encompasses communication of quantum information and qubits used to represent quantum information.

The various illustrative logical blocks, modules, and circuits described in connection with the examples disclosed herein may be implemented or performed with a general purpose processor, a special purpose processor, a Digital Signal Processor, an Integrated Circuit (IC), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer executes computing instructions (e.g., software code, without limitation) related to examples of the present disclosure.

The examples may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, or a subprogram, without limitation. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

In this description, the term "connected" and "communicatively connected" and derivatives thereof may be used to indicate that two elements are capable of communicating with each other. When an element is described as being "connected" or "communicatively connected" to, or with, another element, then the elements may be in direct communication, e.g., through a PCIe-compliant cable, without limitation, or there may be one or more intervening elements present, e.g., switches. In contrast, when an element is described as being "directly connected" to, or with, another element, then there are no intervening elements present, excluding a cable. It will be understood that when an element is referred to as "connected" to a first element and a second element then the element is connected to the first element and the element is connected to the second element.

The PCIe specification defines a bus:device.function number format for identifying ports and devices (e.g., hosts, endpoints, without limitation). The bus:device.function number format includes fields for a bus number, a device number, and a function number. According to the PCIe specification, each endpoint is assigned a unique bus number in the bus:device.function number format. According to the PCIe specification, data is switched between hosts and endpoints according to bus numbers.

As a non-limiting example, a host may be assigned a bus:device.function number of 2:0.0 (i.e., a bus number of "2," a device number of "0" and a function number of "0"), an upstream port of a switch, connected to the host, may be assigned a bus:device.function number of 3:0.0, a first downstream port of the switch may be assigned a bus:device.function number of 4:0.0, a second downstream port of the switch may be assigned a bus:device.function number of 4:1.0, and a thirty-second downstream port of the switch may be assigned a bus:device.function number of 4:31.0. A first endpoint, directly connected to the first downstream port, may be assigned a bus:device.function number of 5:0.0, a second endpoint, directly connected to the second downstream port may be assigned a bus:device.function number of 6:0.0, and a thirty-second endpoint, directly connected to the thirty-second downstream port may be assigned a bus:device.function number of 36:0.0. For a given downstream port, the bus number assigned to a bus directly downstream of the downstream port is referred to as the "secondary bus number," and the highest bus number assigned downstream of the downstream port is called the "subordinate bus number."

PCIe is a point-to-point bus (with the exception of a PCIe switch ("switch"), which may be thought of as a multi-drop bus), so each downstream port is connected to exactly one upstream port of another device, thus, each endpoint is assigned a unique bus number. PCIe Alternative Routing ID (ARI) takes advantage of the unique bus number to repurpose the bits of the device number to describe further functions for an endpoint.

A switch may switch data, according to the PCIe specification, between the host and the endpoints based on the bus number of the host ("2") and the respective bus numbers of the endpoints (i.e., the bus number of the first endpoint ("5"), the bus number of the second endpoint ("6"), and the bus number of the thirty-second endpoint ("36")). As mentioned above, a switch operates as a multi-drop bus where an upstream port is connected with bus N, bus N+1 is a virtual bus between the upstream port and all of the downstream ports of the switch, and bus N+2 is a bus below downstream port 0 of the switch. All of the downstream ports of the switch connected to bus N+1 are assigned device numbers (e.g., 0:M-1).

The bus:device.function number format of the PCIe specification includes 8 bits (an 8-bit field) for the bus number, 5 bits (a 5-bit field) for the device number, and 3 bits (a 3-bit field) for the function number. Thus, according to the PCIe specification, there is a total of 255 bus numbers available to be assigned to devices. Some of these bus numbers may be reserved for an upstream port, a root complex, and/or an internal switch port.

Notably, the bus number is not incremented for each point-to-point (PTP) connection even though different buses may connect respective endpoints with respective downstream ports.

One or more examples relate, generally to assigning unique combinations of bus numbers and device numbers (i.e., utilizing a bus:device.function number format) to ports of a switch and endpoints connected thereto, and to switching data according to such unique combinations of bus numbers and a device numbers.

As a non-limiting example, a host is assigned a bus:device.function number of 2:0.0, an upstream port of a switch connected to the host is assigned a bus:device.function number of 3:0.0, a first downstream port of the switch is assigned a bus:device.function number of 4:0.0, a second downstream port of the switch is assigned a bus:device.function number of 4:1.0, and a thirty-second downstream port of the switch is assigned a bus:device.function number of 4:31.0. The first to thirty-second downstream ports of the switch are assigned the same bus number (here, '4') and different device numbers (here, '0' to '31').

The next (in sequential order) bus number (here, '5') is associated with endpoints directly connected to the downstream ports assigned to bus:device.function numbers 4:0.0 to 4:31.0. A first endpoint, which is directly connected to the first downstream port assigned a bus:device.function number of 4:0.0, is assigned a bus:device.function number of 5:0.0. A second endpoint, which is directly connected to the second downstream port assigned a bus:device.function number of 4:1.0, is assigned a bus:device.function number of 5:1.0. A thirty-second endpoint, which is directly connected to the thirty-second downstream port assigned a bus:device.function number of 4:31.0, is assigned a bus:device.function number of 5:31.0. Thus, the first to thirty-second endpoints are assigned the same bus number (here, '5') and different device numbers (here, '0' to '31').

As discussed above, the device number field of a bus:device.function number is 5-bits and so may represent thirty-two numbers, i.e., 0 to 31. In the event more than thirty-two downstream ports are provided, the next (in sequential order) bus number (here, '6') is associated with a further group of downstream ports of the switch (up to thirty-two further downstream ports). In the event a thirty-third downstream port of the switch is provided, the thirty-third downstream port is assigned a bus:device.function number of 6:0.0. A thirty-fourth downstream port of the switch is assigned a bus:device.function number of 6:1.0. The thirty-third and thirty-fourth downstream ports of the switch are assigned the same bus number (here, '6') and different device numbers (here, '0' and '1').

The next (in sequential order) bus number (here, '7') is associated with endpoints directly connected to the downstream ports assigned to bus:device.function numbers 6:0.0 to 6:1.0. A thirty-third endpoint, which is directly connected to the thirty-third downstream port assigned bus:device.function number 6:0.0, is assigned a bus:device.function number of 7:0.0. A thirty-fourth endpoint, which is directly connected to the thirty-fourth downstream port assigned bus:device.function number 6:1.0, is assigned a bus:device.function number of 7:1.0. Thus, the thirty-third and thirty-fourth endpoints are assigned the same bus number (here, '7') and different device numbers (here, '0' to '31').

In one or more examples, a totality of downstream ports of the switch is assigned a unique combination of bus number and device number. A totality of endpoints directly connected to the downstream ports of the switch is assigned a unique combination of a bus number and a device number.

Some or a totality of downstream ports are assigned the same bus number, and some or a totality of endpoints are assigned the same bus number. The bus number(s) assigned to downstream ports are different than the bus number(s) assigned to endpoints.

In one or more examples, data may be switched between a host and various endpoints at least partially based on one or more of: the bus number and the device number of the host (2:0.x), the respective unique combinations of bus numbers and device numbers of the endpoints (e.g., the bus number and the device number of the first endpoint (5:0.x) to thirty-second endpoint (5:31.x)), the unique combination of bus number and the device number of the thirty-third endpoint (7:0.x), and the unique combination of bus number and the device number of thirty-fourth endpoint (7:1.x).

Switching data based on a unique combination of bus number and device number may allow for 32 times as many combinations of a bus number and a device number than there are available bus numbers that may be represented by the 8-bit bus number field. Thus, switching based on a bus number and a device number may allow for 32 times as many addresses for switching, which may allow for disclosed switches to support larger switched networks, and so fewer switches may support relatively larger networks.

FIG. 1 is a functional block diagram illustrating a device 100 capable of switching data between host and endpoints according to a unique combination of a bus number and a device number, in accordance with one or more examples. In one or more examples, device 100 may be, or may include, a PCIe-compliant switch capable of supporting communication according to the PCIe specification.

Device 100 may include an upstream port 102 for a peripheral component interconnect express (PCIe) compliant ("PCIe-compliant") communicative connection with a host (not illustrated in FIG. 1). Device 100 may include a downstream port 104 for a PCIe-compliant communicative connection with an endpoint (not illustrated in FIG. 1). Device 100 may include a switching logic 106. Switching logic 106 may store a bus identifier 108 and a device identifier 110, which are associated with the endpoint. In one or more examples, switching logic 106 may also store a bus identifier and device identifier of device 100. Switching logic 106 switches data via upstream port 102 and downstream port 104 (and more generally, switches data between a host (not depicted in FIG. 1) and the endpoint (not depicted in FIG. 1)) at least partially responsive to bus identifier 108 and device identifier 110 of the endpoint.

Upstream port 102 and downstream port 104 may be ports for respective PCIe-compliant communicative connections. Upstream port 102 and downstream port 104 may be PCIe-compliant. Upstream port 102 and downstream port 104 may have the same physical configuration. The labels "upstream" and "downstream" may be used to refer to the respective uses of upstream port 102 and downstream port 104 in a network including device 100. As a non-limiting example, upstream port 102 may be connected to a host through a PCIe-compliant communicative connection whereas downstream port 104 may be connected to an endpoint through a PCIe-compliant communicative connection.

Switching logic 106 may be, or may include, any suitable combination of logic circuits to perform operations of switching logic 106 described herein. As a non-limiting example, switching logic 106 may be an integrated circuit (IC) or a hardware processor to execute machine-executable code.

Bus identifier 108 may be, or may include, any suitable identifier for a bus. In one or more examples, bus identifier 108 may be a number. In one or more examples, bus identifier 108 may be a bus number according to a bus: device.function number format, discussed above. In one or more examples, bus identifier 108 may be stored in a secondary bus number field or a subordinate bus number field of a configuration space (as used herein, the term "space" refers to a group of memory addresses, and accordingly, addressable locations in a memory or multiple memories) of switching logic 106.

Bus identifier 108 may be represented by eight bits of the secondary bus number field or the subordinate bus number field. The "secondary bus number" is the bus number of a bus immediately downstream of the downstream port 104. The "subordinate bus number" is the highest bus number of all busses that can be reached via downstream port 104. Respective bus identifiers of buses that can be reached via downstream port 104 are within the range of secondary bus number:subordinate bus number.

Device identifier 110 may be, or may include, any suitable identifier for a device. In one or more examples, device identifier 110 may be a number for a device. In one or more examples, device identifier 110 may be a device number according to a bus:device.function number format, discussed above. Device identifier 110 may be stored in a secondary device number field or a subordinate device number field of a configuration space. In one or more examples, the configuration space in which the device identifier 110 (secondary or subordinate) is stored is a custom configuration space (e.g., vendor-specific configuration space, without limitation).

Device identifier 110 may be represented by the five bits of the secondary device number field or the subordinate device number field. The "secondary device number" is the device number of the device immediately downstream of port 104. The "subordinate device number" is a highest device number of an endpoint connected through downstream port 104. Respective device numbers of devices in a bus:device.function number format that are connected to downstream port 104 are within the range of secondary device number:subordinate device number.

Data 120 may be data switched by switching logic 106 via upstream port 102 and downstream port 104. In one or more examples, data 120 may be PCIe-compliant, in other words, data 120 may be formatted according to a PCIe-compliant format.

Figure 2:
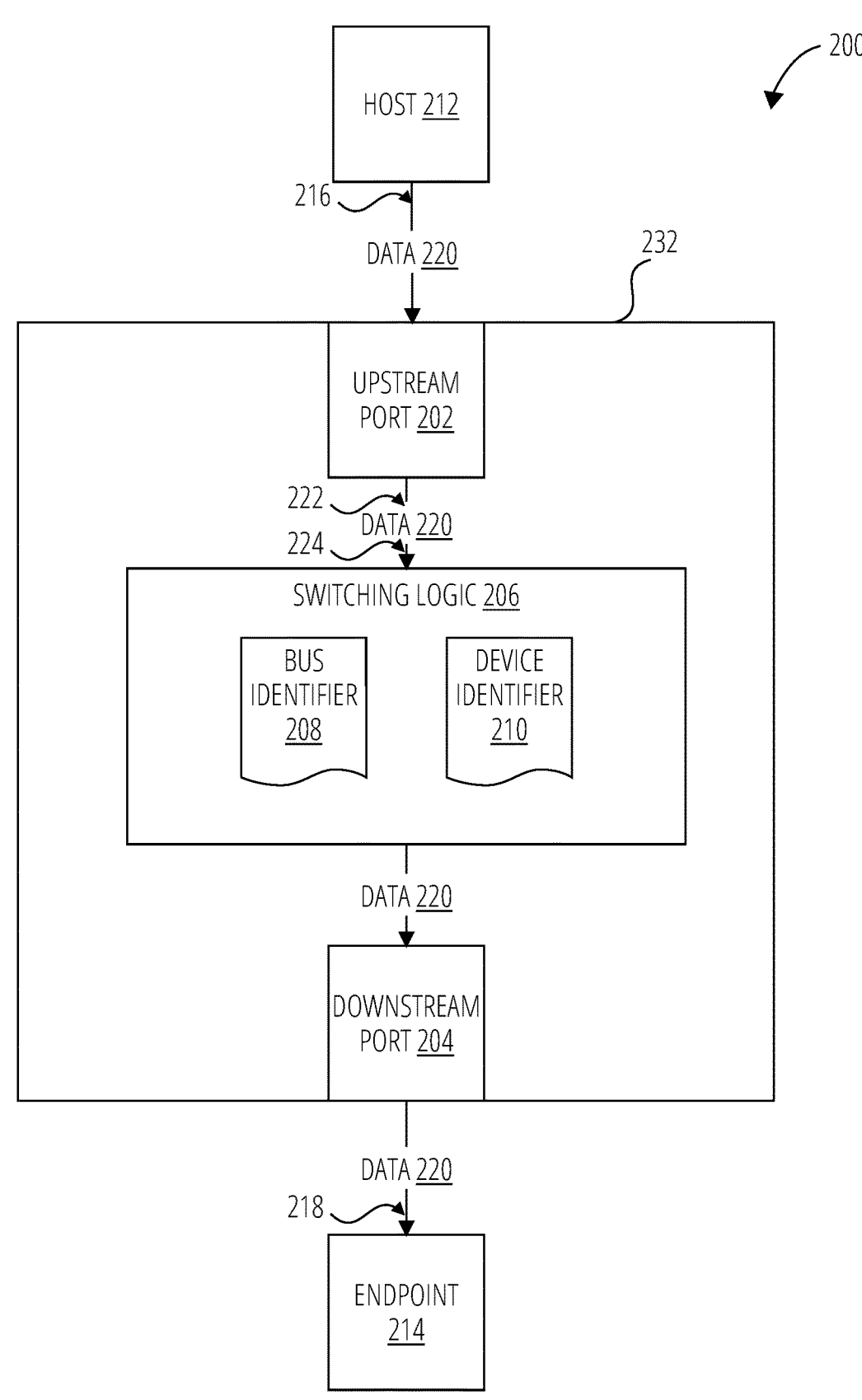
FIG. 2 is a functional block diagram illustrating a system according to one or more examples.

FIG. 2 is a functional block diagram illustrating a system 200 according to one or more examples. System 200 includes a switch 232, which switch 232 may be an example of device 100 of FIG. 1 capable of switching data between host and endpoint at least partially based on a unique combination of bus number and device number. The illustration and description of FIG. 2 provide a non-limiting example of contemplated operations of switch 232 in switching data 220. In particular, the illustration and description of FIG. 2 provide an example of switching data 220 between a host 212 and an endpoint 214 via an upstream port 202 and a downstream port 204 according to a bus identifier 208 and a device identifier 210 assigned to an endpoint 214.

In the present disclosure, elements of FIG. 1 through FIG. 6 may be the same as, or substantially similar to, elements of others of FIG. 1 through FIG. 6. Thus, a reference number assigned the same last two digits as a corresponding reference number in another drawing, may indicate that elements referenced by the respective reference numbers are substantially the same, absent explicit description to the contrary. As a non-limiting example, upstream port 202 of FIG. 2 may be the same as, or substantially similar to upstream port 102 of FIG. 1.

In addition to elements that are the same as, or substantially similar to elements of device 100 of FIG. 1, system 200 includes a host 212 (which host 212 is communicatively connected to upstream port 202 through a PCIe-compliant connection 216) and an endpoint 214 (which endpoint 214 is communicatively connected to a downstream port 204 of switch 232 through a PCIe-compliant connection 218).

Host 212 may be, or may include, a general-purpose computer including a processor. In one or more examples, host 212 may be separate from or part of switch 232. As non-limiting examples, host 212 may be a virtual Root Complex/Host (vRC) inside switch 232, or a sideband manager such as a baseboard management controller (BMC), separate from switch 232. Host 212 may communicate with endpoint 214 through switch 232. Host 212 may include a PCIe-compliant port (not illustrated in FIG. 2).

Endpoint 214 may be, or may include, a device, such as a graphics-processing unit (GPU) or a memory (e.g., a non-volatile memory express (NVMe), without limitation), without limitation.

Data 220 may include a destination bus address 222 and a destination device address 224. Host 212 may include destination bus address 222 and destination device address 224 in data 220. Destination bus address 222 and destination device address 224 may be notated in a bus:device format discussed above.

Switching logic 206 may provide data via upstream port 202 and downstream port 204 at least partially responsive to destination bus address 222 and destination device address 224 of data 220 matching bus identifier 208 and device identifier 210 of endpoint 214.

In one or more examples, switching logic 206 may include a switching table (not depicted in FIG. 2) that relates destination bus address 222 and destination device address 224 with downstream port 204, endpoint 214 being connected to downstream port 204. Switching logic 206 switches data 220 via upstream port 202 and downstream port 204 at least partially based on determined relationship between destination bus address 222 of data 220 and bus identifier 208 assigned to endpoint 214 (which bus identifier 208 may be related to downstream port 204 by the switching table) and a determined relationship between destination device address 224 of data 220 and device identifier 210 assigned to endpoint 214 (which device identifier 210 may be related to downstream port 204 by the switching table).

In one or more examples, such a switching table may include a range of numbers in a bus:device.function format that may be switched via downstream port 204 (only a single endpoint connection to downstream port 204 is depicted by FIG. 2, endpoint 214, but that is illustrative and multiple endpoints may be connected to downstream port 204 without exceeding the scope of this disclosure). In the case of single endpoint connected to downstream port 204, the range of bus:device.function numbers may be stored as bus identifier 208:device identifier 210 and associated with downstream port 204. Since the destination bus address 222 and destination device address 224 received with data 220 fall within the range, switching logic 206 switches data 220 via downstream port 204. Switching logic 206 utilizes both of the bus identifier 208 and device identifier 210 included in the switching table to provide data 220 via downstream port 204, and thus, switch data 220 toward endpoint 214.

Figure 3:
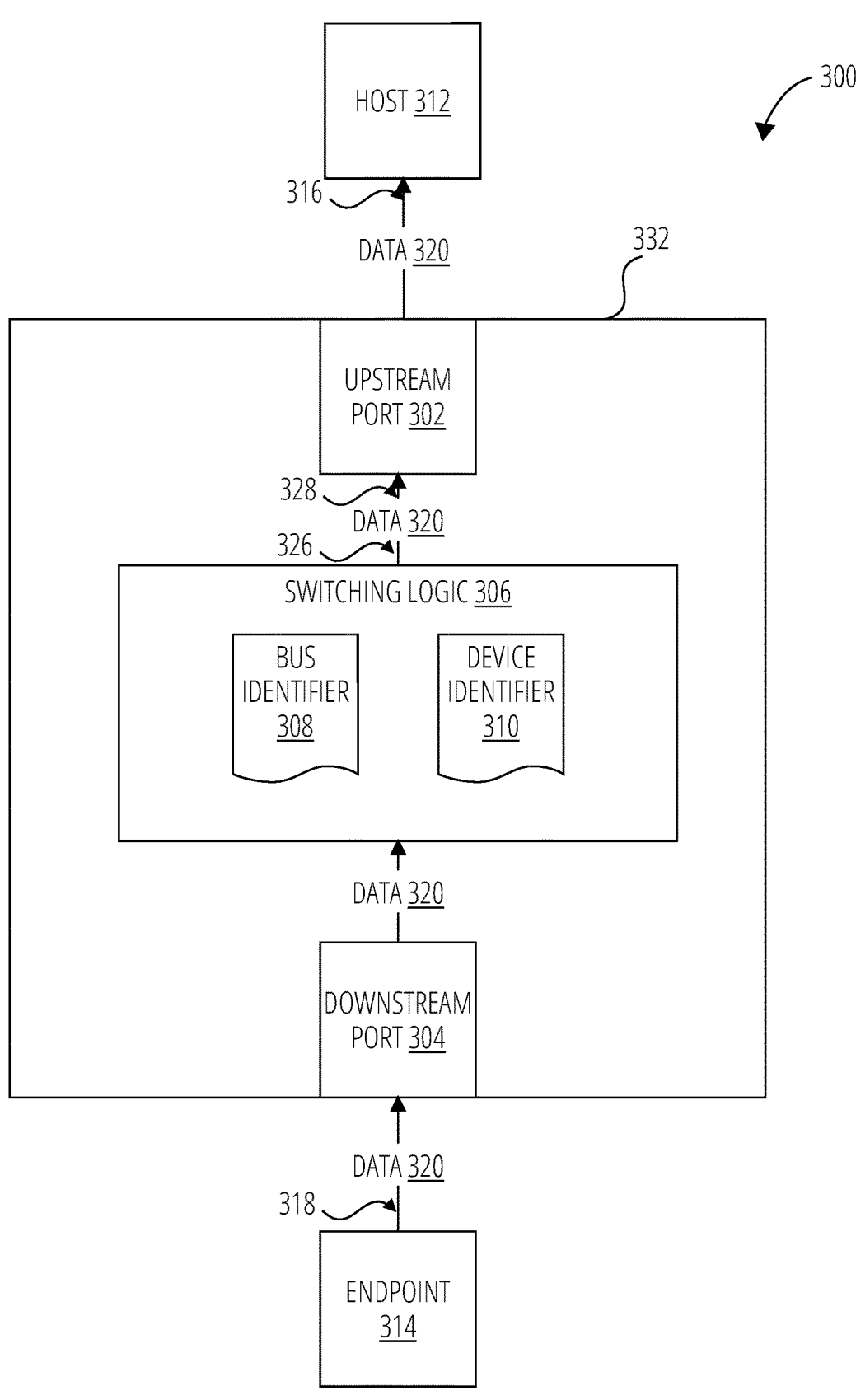
FIG. 3 is a functional block diagram illustrating a system according to one or more examples.

FIG. 3 is a functional block diagram illustrating a system 300 according to one or more examples. System 300 includes a switch 332, which switch 332 may be an example of device 100 of FIG. 1. Switch 332 may be capable of switching according to a bus number and a device number as discussed herein FIG. 3 and related description provide an example of switching data 320 from a downstream port 304 to an upstream port 302 according to a bus identifier 308 and a device identifier 310 stored by switching logic 306 of switch 332, when the bus identifier 308 and device identifier 310 do not fall within the bus:device ranges associated with any downstream ports of switch 332. In such a case, switching logic 306 routes data 320 upstream toward the host 312.

Data 320 may include a source bus address 326 and a source device address 328. In one or more examples, endpoint 314 or switching logic 306 may include source bus address 326 and source device address 328 in data 320. Source bus address 326 may match bus identifier 308 stored for endpoint 314 and source device address 328 may match device identifier 310 stored for endpoint 314. Data 320 may also include a destination bus address and a destination device address (neither of which is illustrated in FIG. 3). In one or more examples, endpoint 314 or switching logic 306 may include the destination bus address and the destination device address in data 320.

The destination bus address and the destination device address may indicate that data 320 is to be provided to host 312. Switching logic 306 may switch data 320 according to the destination bus address and/or the destination device address. When switching logic 306 switches data 320 according to a destination bus address and a destination device address associated with an upstream device, such as a host, without limitation, it may utilize negative routing technique. In a negative routing technique, switching logic 306 first recognizes that the destination bus address and destination device address do not fall within any of the ranges of bus:device.function numbers associated with downstream ports. Upon recognizing that the destination bus address and destination device address do not fall within any of the ranges of bus:device.function numbers associated with downstream ports, it automatically routes the data upstream (via upstream port 302) toward host 312.

Switch 332 provides data 320 including source bus address 326 and source device address 328. Host 312 may use the provided source bus address 326 and the provided source device address when sending data to endpoint 314 (e.g., as described with regard to FIG. 2).

Figure 4:
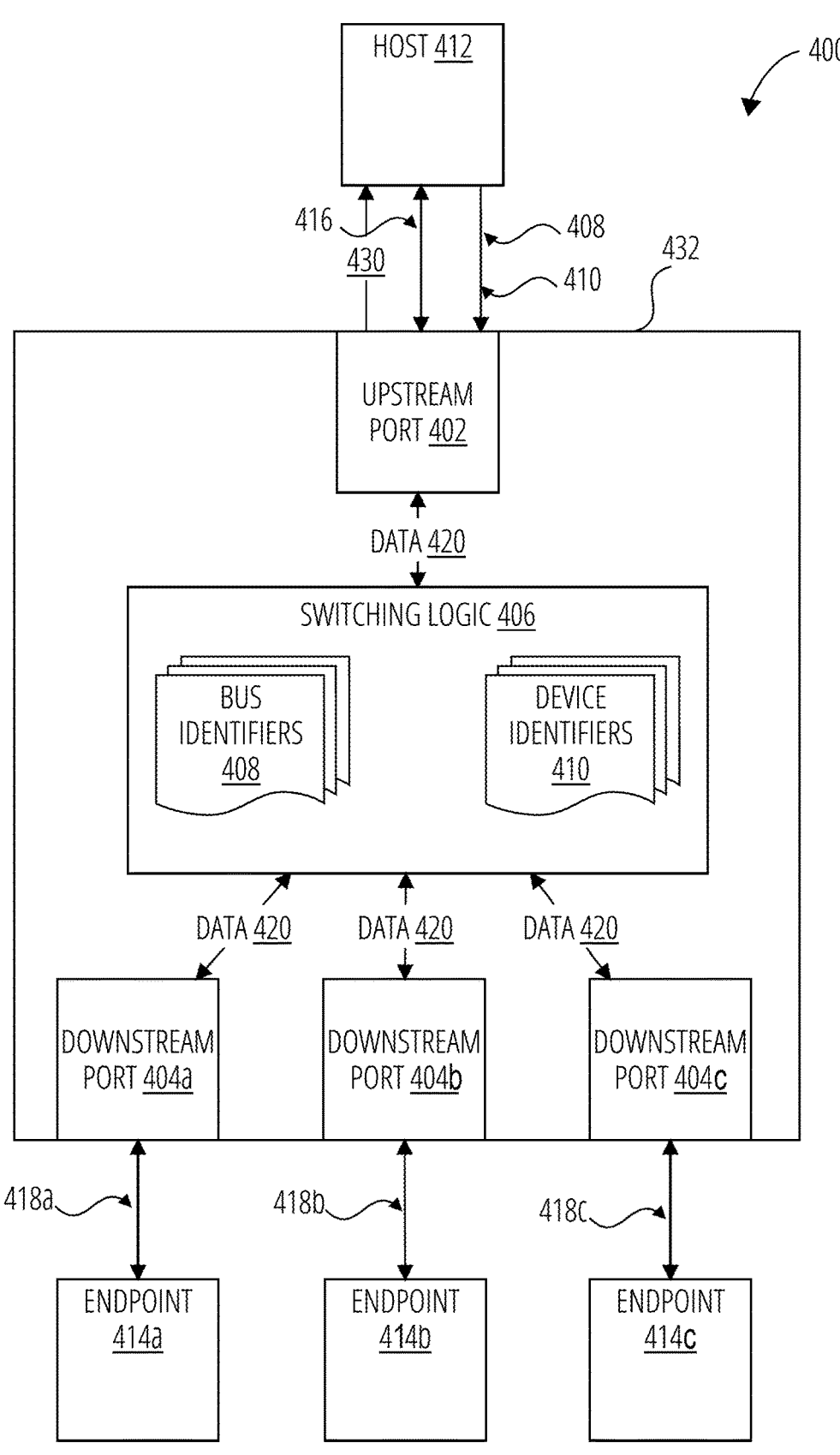
FIG. 4 is a functional block diagram illustrating a system according to one or more examples.

FIG. 4 is a functional block diagram illustrating a system 400 according to one or more examples. System 400 includes a switch 432, which switch 432 may be an example of device 100 of FIG. 1. Switch 432 may be capable of switching according to a bus number and a device number. The illustration and description of FIG. 4 provide an example of contemplated operations of switch 432 in switching data 420. In particular, the illustration and description of FIG. 4 provide an example of switching data 420 via an upstream port 302, a downstream port 404a, a downstream port 404b, and a downstream port 404c according to bus identifiers 408 and device identifiers 410.

Switch 432 includes three downstream ports 404—downstream port 404a, downstream port 404b, and downstream port 404c. Downstream port 404a, downstream port 404b, and downstream port 404c may be referred to collectively as "downstream ports 404." Downstream port 404a may be connected to an endpoint 414a through a PCI-compliant connection 418a. Downstream port 404b may be connected to an endpoint 414b through a PCI-compliant connection 418b. Downstream port 404c may be connected to an endpoint 414c through a PCI-compliant connection 418c.

Endpoint 414a, endpoint 414b, and endpoint 414c may be referred to collectively as "endpoints 414." In FIG. 4, three downstream ports 404 and three endpoints 414 are illustrated for descriptive purposes. Switch 432 (and other switches and devices described herein) may be connected to any number of endpoints through any number of respective downstream ports.

Bus identifiers 408 may include a bus identifier (e.g., a bus number, without limitation) and device identifiers 410 may include a device identifier (e.g., a device number, without limitation) assigned to respective endpoints 414. In other words, switching logic 406 may store a bus identifier and a device identifier for respective ones of endpoints 414. Switching logic 406 may store a unique combination of a bus identifier and a device identifier for respective ones of endpoints 414. In the unique combinations of bus identifiers and device identifiers, switching logic 406 may store the same bus identifier for two or more endpoints 414. Switching logic 406 may switch data 420 between host 412 and endpoints 414 according to the respective unique combinations of bus identifier and device identifier of endpoints 414.

As a non-limiting example, endpoint 414a may be assigned a bus:device.function number of 5:0.0, endpoint 414b may be assigned a bus:device.function number of 5:1.0, and endpoint 414c may be assigned a bus:device-.function number of 5:2.0. Switch 432 may switch data between host 412 and endpoints 414 based on the bus number and the device number of the host and the respective bus numbers and device numbers of the endpoints 414 (e.g., the bus number and the device number of the endpoint 414a (5:0.x), the bus number and the device number of endpoint 414b (5:1.x), and the bus number and the device number of endpoint 414c (5:2.x)). Switch 432 may switch data between host 412 and endpoints 414 based on the respective bus numbers and device numbers of the endpoints 414.

Switching logic 406 may provide, to host 412, a functionality indicator 430 indicative of a switching functionality of one or more of downstream ports 404. As a non-limiting example, switching logic 406 may advertise a switching functionality of switch 432 (that may be relative to respective downstream ports 404) in a configuration space of switching logic 406 that is accessible to host 412. The switching functionality may be, or may include, a capability of switch 432 to switch data 420 to, and from, downstream ports 404 based on a bus identifier 408 and a device identifier 410. Additionally or alternatively, the switching functionality may include a capability of switch 432 to store a bus identifier 408 and a device identifier 410 for respective endpoints 414. Functionality indicator 430 may be based on a direct connection between respective ones of downstream ports 404 and respective ones of endpoints 414. As a non-limiting example, switching logic 406 may provide functionality indicator 430 indicative of the switching functionality of downstream ports 404 that are directly connected to endpoints 414.

Host 412 may provide the bus identifiers 408 and device identifiers 410 to switch 432. As a non-limiting example, host 412 may assign bus identifiers 408 and device identifiers 410 to the respective endpoints 414. As a non-limiting example, host 412 may assign a first combination of a bus identifier 408 and a device identifier 410 to endpoint 414a, host 412 may assign a second combination of a bus identifier 408 and a device identifier 410 to endpoint 414b, and host 412 may assign a third combination of a bus identifier 408 and a device identifier 410 to endpoint 414c. Host 412 may assign a unique combination of a bus identifier 408 and a device identifier 410 to respective ones of endpoints 414.

Host 412 may provide bus identifiers 408 and device identifiers 410 responsive to receiving functionality indicator 430 from switch 432. As a non-limiting example, switching logic 406 may provide functionality indicator 430 to host 412. Functionality indicator 430 may include an indication of downstream ports 404 that are directly connected to endpoints 414 and an indication that switching logic 406 is capable of switching data 420 to and from the downstream ports 404 that are directly connected to endpoints 414 responsive to a unique combination of a bus identifier and a device identifier for respective endpoints 414. Responsive to functionality indicator 430, host 412 may assign bus identifiers 408 and device identifiers 410 to endpoints 414. Switching logic 406 may store bus identifiers 408 and device identifiers 410. Thereafter, switching logic 406 may switch data between host 412 and endpoints 414.

Figure 5:
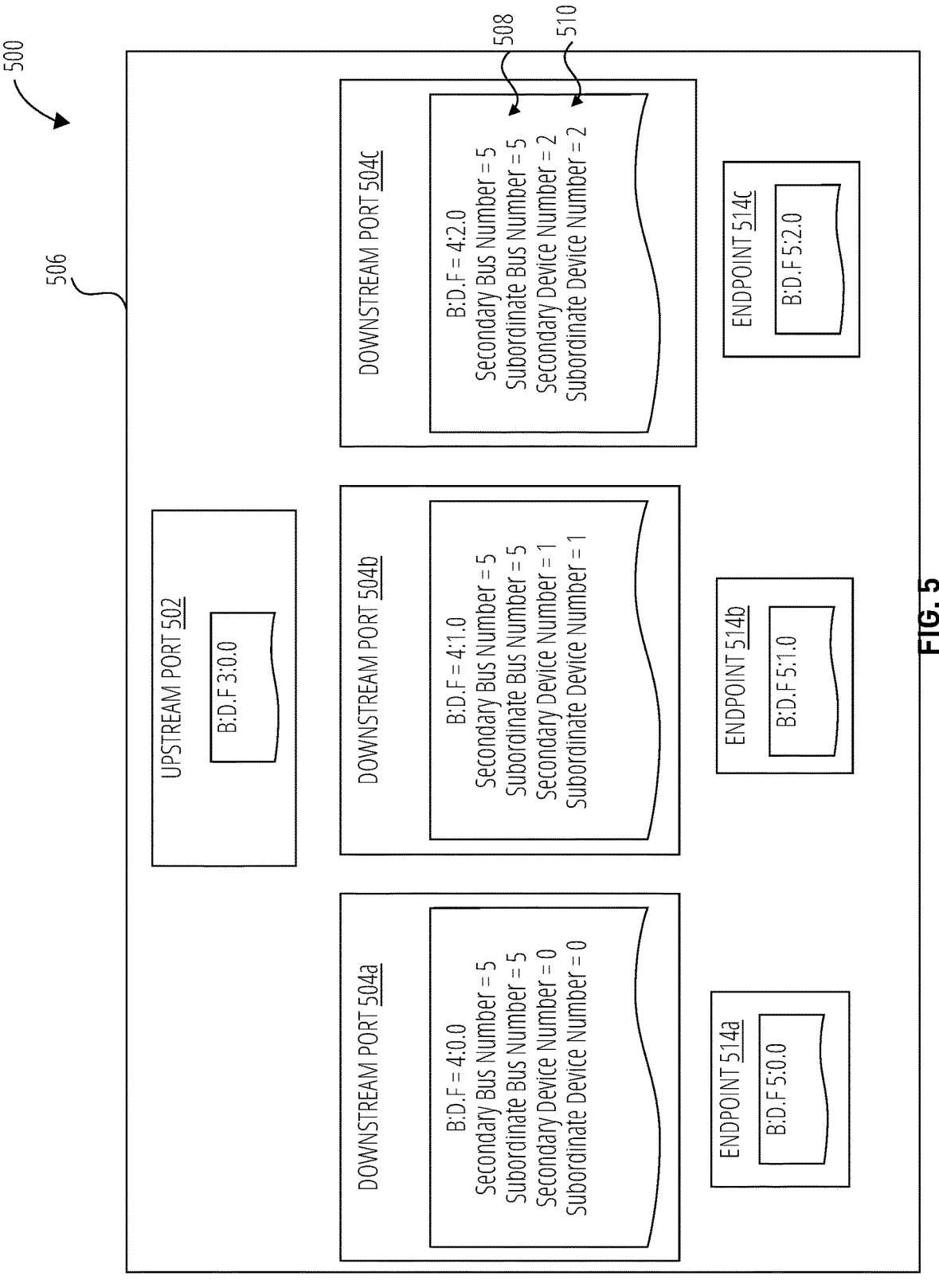
FIG. 5 is a functional block diagram illustrating a device according to one or more examples.

FIG. 5 is a functional block diagram illustrating a device 500 according to one or more examples. Device 500 may be an example of device 100 of FIG. 1. Device 500 may be capable of switching according to a bus number and a device number. The illustration and description of FIG. 5 provide an example of contemplated operations of device 500. In particular, the illustration and description of FIG. 5 provide an example of bus numbers and device numbers as related to ports and endpoints.

Device 500 includes switching logic 506. Switching logic 506 does not include ports or endpoints. The illustration of ports and endpoints in switching logic 506 in FIG. 5 is intended to illustrate a relationship between the ports and bus identifiers 508 and device identifiers 510 stored by switching logic 506.

Switching logic 506 may store bus:device.function numbers for ports. As a non-limiting example, switching logic 506 may store a bus:device.function number of 3:0.0 of upstream port 502, a bus:device.function number of 4:0.0 for downstream port 504a, a bus:device.function number of 4:1.0 for downstream port 504b, and a bus:device.function number of 4:2.0 for downstream port 504c. The bus:device.function numbers may be according to the PCIe specification. The bus number may be represented by eight bits, the device number may be represented by five bits, and the function number may be represented by three bits.

Further, switching logic 506 may store bus identifiers 508 and device identifiers 510 of endpoints 514. The bus identifiers 508 and device identifiers 510 may be related to the downstream ports 504 to which the endpoints 514 are connected.

As a non-limiting example, switching logic 506 may store a bus identifier 508 of "5" and a device identifier 510 of "0" of endpoint 514a related to downstream port 504a (because downstream port 504a is connected to endpoint 514a). Further, switching logic 506 may store a bus identifier 508 of "5" and a device identifier 510 of "1" of endpoint 514b related to downstream port 504b (because downstream port 504b is connected to endpoint 514b). Additionally, switching logic 506 may store a bus identifier 508 of "5" and a device identifier 510 of "2" of endpoint 514c related to downstream port 504c (because downstream port 504c is connected to endpoint 514c). The respective bus identifiers 508 may be stored by switching logic 506 in fields named "secondary bus number" and/or "subordinate bus number." The respective device identifiers 510 may be stored by switching logic 506 in fields named "secondary device number" and/or "subordinate device number." The bus identifier 508 may be stored as numbers that may be represented by eight bits and the device identifier 510 may be stored as numbers that may be represented by five bits.

The bus:device.function numbers of endpoints 514 may be related to bus identifier 508 and device identifier 510. As a non-limiting example, endpoint 514a may have a bus:device.function number of 5:0.0. The bus number of "5" of endpoint 514a may be based on the bus identifier 508 stored in relation to downstream port 504a (because downstream port 504a is connected to endpoint 514a). Similarly, the device number "0" of endpoint 514a may be based on the device identifier 510 stored in relation to downstream port 504a. Additionally, endpoint 514b may have a bus:device.function number of 5:1.0. The bus number of "5" of endpoint 514b may be based on the bus identifier 508 stored in relation to downstream port 504b (because downstream port 504b is connected to endpoint 514b). Similarly, the device number "1" of endpoint 514b may be based on the device identifier 510 stored in relation to downstream port 504b. Additionally, endpoint 514c may have a bus:device.function number of 5:2.0. The bus number of "5" of endpoint 514c may be based on the bus identifier 508 stored in relation to downstream port 504c (because downstream port 504c is connected to endpoint 514c). Similarly, the device number "2" of endpoint 514c may be based on the device identifier 510 stored in relation to downstream port 504c.

In some examples, switching logic 506 may store a bus:device.function number for endpoints 514. As a non-limiting example, switching logic 506 may store a bus:device.function number of 5:0.0 for endpoint 514a, a bus:device.function number of 5:1.0 for endpoint 514b, and a bus:device.function number of 5:2.0 for endpoint 514c.

Figure 6:
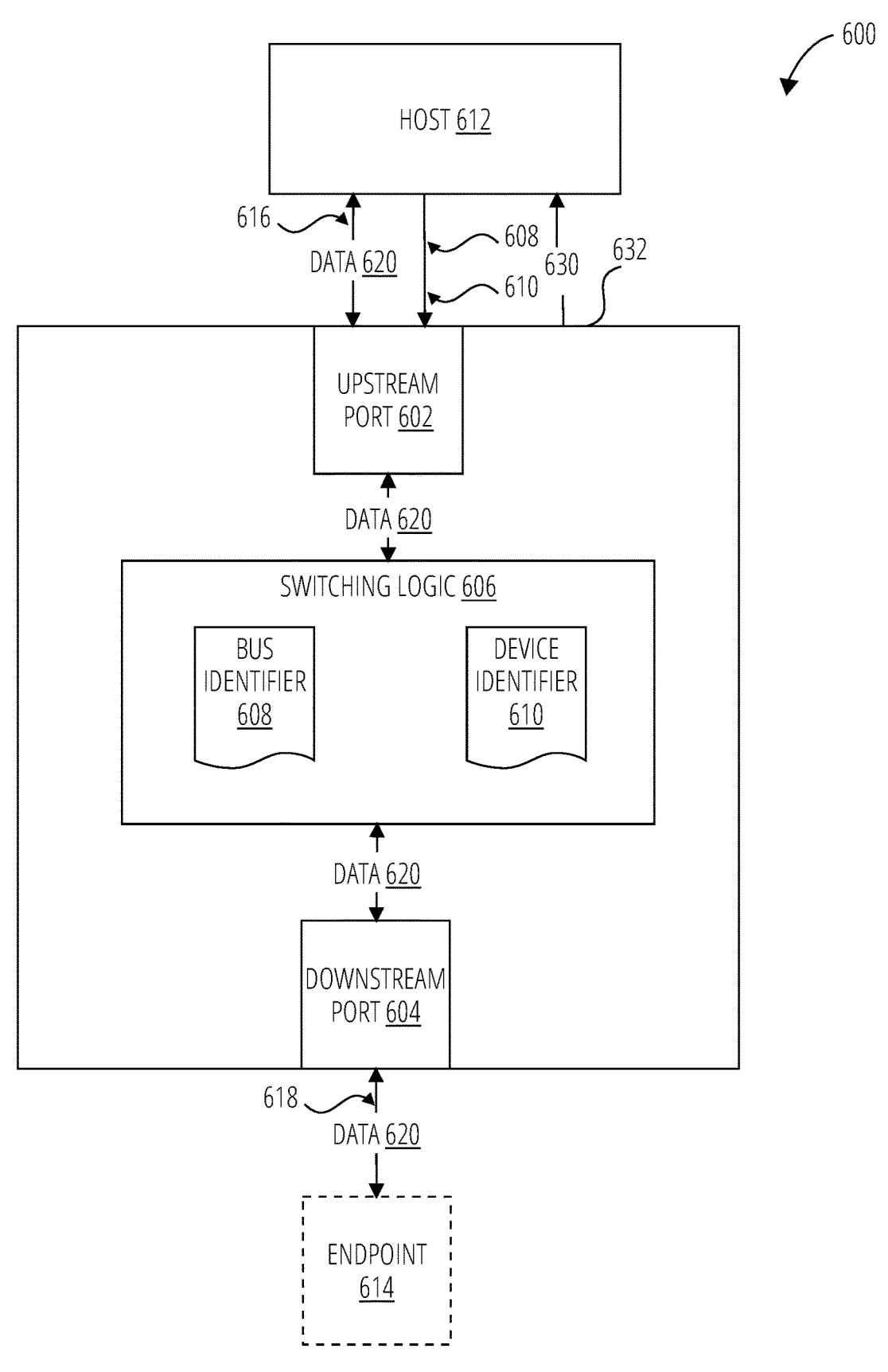
FIG. 6 is a functional block diagram illustrating a system according to one or more examples.

FIG. 6 is a functional block diagram illustrating a system 600 according to one or more examples. System 600 includes a switch 632, which switch 632 may be an example of device 100 of FIG. 1. Switch 632 may be capable of switching according to a bus number and a device number.

System 600 may include switch 632 and a host 612. Switch 632 may include an upstream port 602 and a downstream port 604. Downstream port 604 may be directly connected, through a downstream PCIe-compliant connection 618, to an endpoint 614. Endpoint 614 is optional in system 600. The optionality of endpoint 614 in system 600 is illustrated by endpoint 614 being illustrated using dashed lines. Switch 632 may include a switching logic 606. Switching logic 606 may store a bus identifier 608 and a device identifier 610 for the endpoint 614. Switching logic 606 may switch data 620 via upstream port 602 and downstream port 604 at least partially responsive to bus identifier 608 and device identifier 610 of endpoint 614. In some non-limiting examples, switching logic 606 may provide functionality indicator 630 to host 612. Host 612 may be connected to upstream port 602 of switch 632 through an upstream PCIe-compliant connection 616. Host 612 may assign bus identifier 608 and device identifier 610 to endpoint 614.

FIG. 7 is a flowchart of a method 700, according to one or more examples. At least a portion of method 700 may be performed, in some examples, by a device or system, such as device 100 of FIG. 1, switch 232 of FIG. 2, switch 332 of FIG. 3, switch 432 of FIG. 4, device 500, of FIG. 5, switch 632 of FIG. 6, or another device or system. Although illustrated as discrete blocks, various blocks may be divided into additional blocks, combined into fewer blocks, or eliminated, depending on the desired implementation.

At operation 702, a bus identifier and a device identifier for an endpoint directly connected to a downstream port of a switch through a PCIe-compliant connection may be stored. As a non-limiting example, bus identifier 108 of FIG.

1 and device identifier 110 of FIG. 1 may be stored at switching logic 106 of FIG. 1.

At operation 704, data may be switched via the upstream port and the downstream port at least partially responsive to the bus identifier and the device identifier of the endpoint. As a non-limiting example, data 120 of FIG. 1 may be switched via upstream port 102 of FIG. 1 and downstream port 104 of FIG. 1 at least partially responsive to bus identifier 108 and device identifier 110 of an endpoint (e.g., endpoint 214 of FIG. 2, without limitation). More generally, the data may be switched from a host to an endpoint, or vice-versa, via a switch that includes the upstream port, downstream port, and switching logic that utilizes the bus identifier and device identifier.

FIG. 8 is a flowchart of a method 800, according to one or more examples. At least a portion of method 800 may be performed, in some examples, by a device or system, such as device 100 of FIG. 1, switch 232 of FIG. 2, switch 332 of FIG. 3, switch 432 of FIG. 4, device 500, of FIG. 5, switch 632 of FIG. 6, or another device or system. Although illustrated as discrete blocks, various blocks may be divided into additional blocks, combined into fewer blocks, or eliminated, depending on the desired implementation.

At operation 802, a host, connected to an upstream port of a switch through a PCIe-compliant connection, may be provided with a functionality indicator indicative of a switching functionality of a downstream port. As a non-limiting example, host 612 of FIG. 6, which may be connected to upstream port 602 of FIG. 6 of switch 632 of FIG. 6 through PCIe-compliant connection 616 of FIG. 6, may be provided with functionality indicator 630 of FIG. 6, which functionality indicator 630 may be indicative of a switching functionality of downstream port 604 of FIG. 6. In particular, the functionality indicator may indicate that downstream port 604 is switchable at least partially responsive to the bus identifier and the device identifier of the endpoint. There is no requirement that all downstream ports of a switch be switchable at least partially responsive to the bus identifier and the device identifier of the endpoint.

At operation 804, a bus identifier and a device identifier may be received from a host connected to the upstream port through an upstream PCIe-compliant connection. As a non-limiting example, bus identifier 608 of FIG. 6 and device identifier 610 of FIG. 6 may be received at switch 632 from host 612, which host 612 may be connected to upstream port 602 through PCIe-compliant connection 616, which bus identifier 608 of FIG. 6 and device identifier 610 of FIG. 6 may be assigned by host 612 for respective downstream port 604 of FIG. 6.

Operation 806 may be the same as, or substantially similar to, operation 702 of FIG. 7. Operation 808 may be the same as, or substantially similar to, operation 704 of FIG. 7.

At operation 810, data may be provided from the upstream port to the downstream port at least partially responsive to a destination bus address of the data matching a bus identifier of the endpoint and at least partially responsive to a destination device address of the data matching a device identifier of the endpoint. As a non-limiting example, data 220 of FIG. 2 may be provided from upstream port 202 of FIG. 2 to downstream port 204 of FIG. 2 at least partially responsive to a destination bus address 222 of FIG. 2 of data 220 matching a bus identifier 208 of FIG. 2 of endpoint 214 of FIG. 2 and at least partially responsive to a destination device address 224 of FIG. 2 of data 220 matching a device identifier 210 of FIG. 2 of endpoint 214. Operation 810 may be a subset of operation 808. As a non-limiting example, operation 810 may be an example of some of the operations involved in the switching of operation 808. As a non-limiting example, operation 810 may be an example of switching data from an upstream port to a downstream port. More generally, the data may be switched from a host to an endpoint, or vice-versa, via a switch that includes the upstream port, downstream port, and switching logic that utilizes the bus identifier and device identifier.

At operation 812, data may be provided from the downstream port to the upstream port. The data may include a source bus address that may match a bus identifier of the endpoint and a source device address that may match a device identifier of the endpoint. As a non-limiting example, data 320 of FIG. 3 may be provided from downstream port 304 of FIG. 3 to upstream port 302 of FIG. 3. Data 320 may include source bus address 326 of FIG. 3 that may match a bus identifier 308 of FIG. 3 and a source device address 328 of FIG. 3 that may match a device identifier 310 of FIG. 3 of endpoint 314 of FIG. 3. Operation 812 may be a subset of operation 808. As a non-limiting example, operation 812 may be an example of some of the operations involved in the switching of operation 808. As a non-limiting example, operation 812 may be an example of switching data from a downstream port to an upstream port.

Modifications, additions, or omissions may be made to method 700 and/or method 800 without departing from the scope of the present disclosure. For example, the operations of method 700 and/or method 800 may be implemented in differing order. Furthermore, the outlined operations and actions are only provided as examples, and some of the operations and actions may be optional, combined into fewer operations and actions, or expanded into additional operations and actions without detracting from the essence of the disclosed example.

Figure 9:
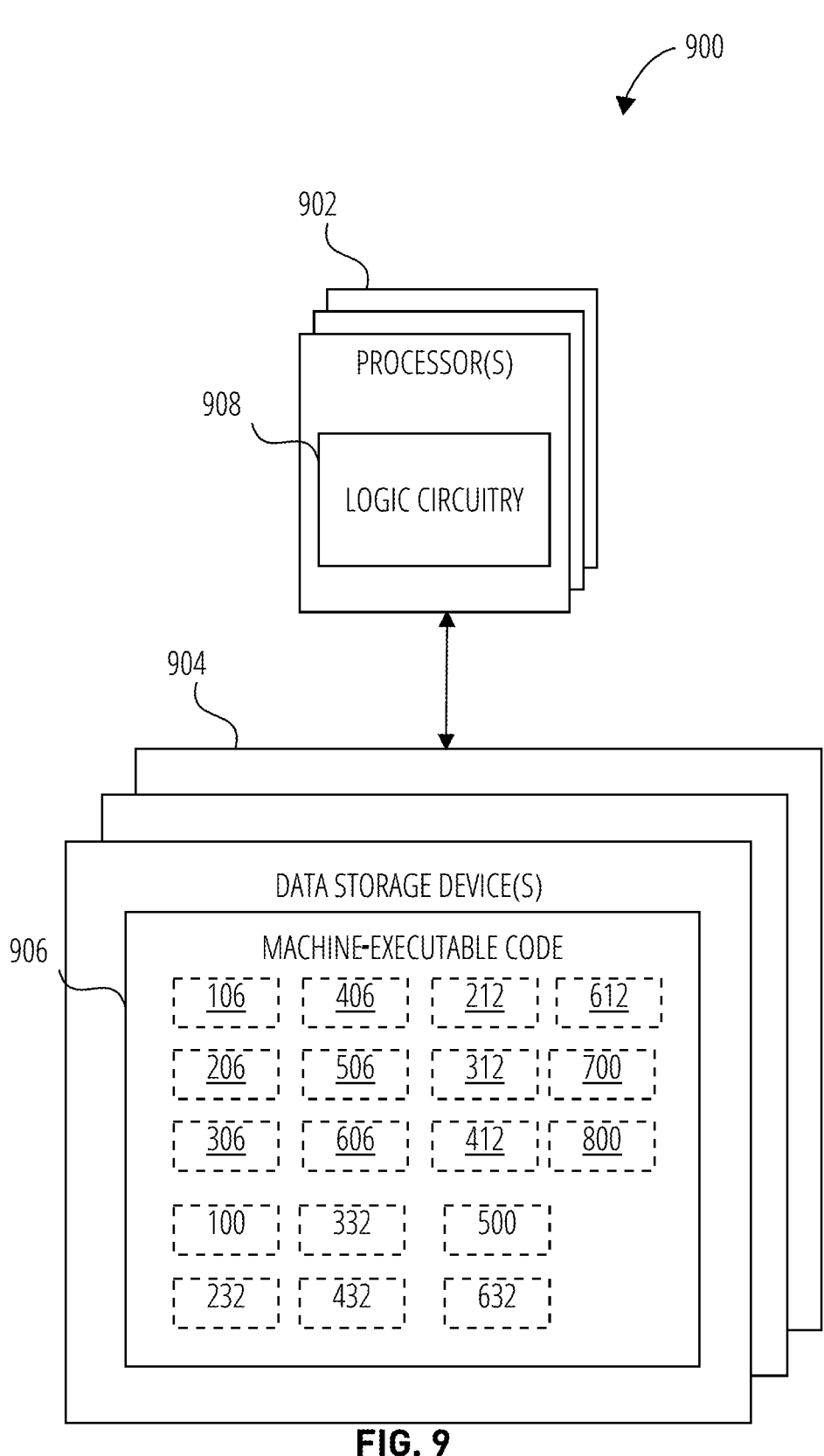
FIG. 9 illustrates a block diagram of a device that may be used to implement various functions, operations, acts, processes, or methods, in accordance with one or more examples.

FIG. 9 is a block diagram of a device 900 that, in one or more examples, may be used to implement various functions, operations, acts, processes, or methods disclosed herein. Device 900 includes one or more processors 902 (sometimes referred to herein as "processors 902") operably connected to one or more apparatuses such as data storage devices (sometimes referred to herein as "storage 904"), without limitation. Storage 904 includes machine executable code 906 stored thereon (e.g., stored on a computer-readable memory, without limitation) and processors 902 include logic circuitry 908. Machine executable code 906 include information describing functional elements that may be implemented by (e.g., performed by) logic circuitry 908. Logic circuitry 908 is implements (e.g., performs) the functional elements described by machine executable code 906. Device 900, when executing the functional elements described by machine executable code 906, should be considered as special purpose hardware may carry out the functional elements disclosed herein. In one or more examples, processors 902 may perform the functional elements described by machine executable code 906 sequentially, concurrently (e.g., on one or more different hardware platforms), or in one or more parallel process streams.

When implemented by logic circuitry 908 of processors 902, machine executable code 906 may adapt processors 902 to perform operations of examples disclosed herein. For example, machine executable code 906 may adapt processors 902 to perform at least a portion or a totality of method 700 of FIG. 7 and/or method 800 of FIG. 8. As another example, machine executable code 906 may adapt processors 902 to perform at least a portion or a totality of the operations discussed for device 100 of FIG. 1, switching logic 106 of FIG. 1, switching logic 206 of FIG. 2, host 212 of FIG. 2, switch 232 of FIG. 2, switching logic 306 of FIG.

3, host 312 of FIG. 3, switch 332 of FIG. 3, switching logic 406 of FIG. 4, host 412 of FIG. 4, switch 432 of FIG. 4, device 500 of FIG. 5, switching logic 506 of FIG. 5, switching logic 606 of FIG. 6, host 612 of FIG. 6, and/or switch 632 of FIG. 6.

Processors 902 may include a general purpose processor, a special purpose processor, a central processing unit (CPU), a microcontroller, a programmable logic controller (PLC), a digital signal processor (DSP), an application specific integrated circuit (ASIC), a field-programmable gate array (FPGA) or other programmable logic device, discrete gate or transistor logic, discrete hardware components, other programmable device, or any combination thereof designed to perform the functions disclosed herein. A general-purpose computer including a processor is considered a special-purpose computer while the general-purpose computer executes computing instructions (e.g., software code, without limitation) related to examples. It is noted that a general-purpose processor (may also be referred to herein as a host processor or simply a host) may be a microprocessor, but in the alternative, processors 902 may include any conventional processor, controller, microcontroller, or state machine. Processors 902 may also be implemented as a combination of computing devices, such as a combination of a DSP and a microprocessor, a plurality of microprocessors, one or more microprocessors in conjunction with a DSP core, or any other such configuration.

In one or more examples, storage 904 includes volatile data storage (e.g., random-access memory (RAM), without limitation), non-volatile data storage (e.g., Flash memory, a hard disc drive, a solid-state drive, erasable programmable read-only memory (EPROM), without limitation). In one or more examples, processors 902 and storage 904 may be implemented into a single device (e.g., a semiconductor device product, a system on chip (SOC), without limitation). In one or more examples, processors 902 and storage 904 may be implemented into separate devices.

In one or more examples, machine executable code 906 may include computer-readable instructions (e.g., software code, firmware code, without limitation). By way of non-limiting example, the computer-readable instructions may be stored by storage 904, accessed directly by processors 902, and executed by processors 902 using at least logic circuitry 908. Also by way of non-limiting example, the computer-readable instructions may be stored on storage 904, transmitted to a memory device (not shown) for execution, and executed by processors 902 using at least logic circuitry 908. Accordingly, in one or more examples logic circuitry 908 includes electrically configurable logic circuitry.

In one or more examples, machine executable code 906 may describe hardware (e.g., circuitry, without limitation) to be implemented in logic circuitry 908 to perform the functional elements. This hardware may be described at any of a variety of levels of abstraction, from low-level transistor layouts to high-level description languages. At a high-level of abstraction, a hardware description language (HDL) such as an Institute of Electrical and Electronics Engineers (IEEE) Standard hardware description language (HDL) may be used, without limitation. By way of non-limiting examples, Verilog™, SystemVerilog™ or very large scale integration (VLSI) hardware description language (VHDL™) may be used.

HDL descriptions may be converted into descriptions at any of numerous other levels of abstraction as desired. As a non-limiting example, a high-level description can be converted to a logic-level description such as a register-transfer language (RTL), a gate-level (GL) description, a layout-level description, or a mask-level description. As a non-limiting example, micro-operations to be performed by hardware logic circuits (e.g., gates, flip-flops, registers, without limitation) of logic circuitry 908 may be described in a RTL and then converted by a synthesis tool into a GL description, and the GL description may be converted by a placement and routing tool into a layout-level description that corresponds to a physical layout of an integrated circuit of a programmable logic device, discrete gate or transistor logic, discrete hardware components, or combinations thereof. Accordingly, in one or more examples machine executable code 906 may include an HDL, an RTL, a GL description, a mask level description, other hardware description, or any combination thereof.

In examples where machine executable code 906 includes a hardware description (at any level of abstraction), a system (not shown, but including storage 904) may implement the hardware description described by machine executable code 906. By way of non-limiting example, processors 902 may include a programmable logic device (e.g., an FPGA or a PLC, without limitation) and the logic circuitry 908 may be electrically controlled to implement circuitry corresponding to the hardware description into logic circuitry 908. Also by way of non-limiting example, logic circuitry 908 may include hard-wired logic manufactured by a manufacturing system (not shown, but including storage 904) according to the hardware description of machine executable code 906.

Regardless of whether machine executable code 906 includes computer-readable instructions or a hardware description, logic circuitry 908 performs the functional elements described by machine executable code 906 when implementing the functional elements of machine executable code 906. It is noted that although a hardware description may not directly describe functional elements, a hardware description indirectly describes functional elements that the hardware elements described by the hardware description are capable of performing.

As used herein, the term "substantially" in reference to a given parameter, property, or condition means and includes to a degree that one skilled in the art would understand that the given parameter, property, or condition is met with a small degree of variance, such as within acceptable manufacturing tolerances. For example, a parameter that is substantially met may be at least about 90% met, at least about 95% met, or even at least about 99% met.

As used in the present disclosure, the terms "module" or "component" may refer to specific hardware implementations may perform the actions of the module or component or software objects or software routines that may be stored on or executed by general purpose hardware (e.g., computer-readable media, processing devices, without limitation) of the computing system. In one or more examples, the different components, modules, engines, and services described in the present disclosure may be implemented as objects or processes that execute on the computing system (e.g., as separate threads, without limitation). While some of the system and methods described in the present disclosure are generally described as being implemented in software (stored on or executed by general purpose hardware), specific hardware implementations or a combination of software and specific hardware implementations are also possible and contemplated.

As used in the present disclosure, the term "combination" with reference to a plurality of elements may include a combination of all the elements or any of various different sub-combinations of some of the elements. For example, the phrase "A, B, C, D, or combinations thereof" may refer to any one of A, B, C, or D; the combination of each of A, B, C, and D; and any sub-combination of A, B, C, or D such as A, B, and C; A, B, and D; A, C, and D; B, C, and D; A and B; A and C; A and D; B and C; B and D; or C and D.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," without limitation). As used herein, "each" means "some or a totality." As used herein, "each and every" means "a totality."

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" or "an" means "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, without limitation" or "one or more of A, B, and C, without limitation." is used, in general such a construction is intended to include A alone, B alone, C alone, A and B together, A and C together, B and C together, or A, B, and C together, without limitation.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additional non-limiting examples of the disclosure may include:

Example 1: A device comprising: an upstream port for a respective peripheral component interconnect express (PCIe)-compliant communicative connection with a host; a downstream port for a respective PCIe-compliant communicative connection with an endpoint; and a switching logic to: store a bus identifier and a device identifier for the endpoint; and switch data at least partially responsive to both the bus identifier and the device identifier of the endpoint.

Example 2: The device according to Example 1, wherein the switching logic to switch data between the host and the endpoint at least partially responsive to the bus identifier and the device identifier of the endpoint.

Example 3: The device according to Examples 1 and 2, wherein the switching logic to switch data via one or more of: the upstream port and the downstream port.

Example 4: The device according to Examples 1 to 3, wherein the switching logic to provide data from the upstream port to the downstream port at least partially responsive to a destination bus address of the data matching the stored bus identifier for the endpoint and at least partially responsive to a destination device address of the data matching the stored device identifier for the endpoint.

Example 5: The device according to Examples 1 to 4, wherein the switched data including a source bus address matching the bus identifier of the endpoint and a source device address matching the device identifier of the endpoint.

Example 6: The device according to Examples 1 to 5, wherein the switching logic to provide, to the host, a functionality indicator indicative of a switching functionality of the downstream port of the device.

Example 7: The device according to Examples 1 to 6, wherein the device comprises additional downstream ports directly connected to respective additional endpoints and wherein the switching logic to provide, to the host, additional functionality indicators indicative of respective switching functionalities of the respective additional downstream ports.

Example 8: The device according to Examples 1 to 7, wherein the switching logic to receive the bus identifier and the device identifier for the endpoint from the host.

Example 9: The device according to Examples 1 to 8, wherein the bus identifier is represented by 8 bits and the device identifier is represented by 5 bits, respectively according to a bus:device.function number format according to the PCIe specification.

Example 10: The device according to Examples 1 to 9, wherein the switching logic to store a secondary bus identifier and a secondary device identifier for the endpoint.

Example 11: The device according to Examples 1 to 10, wherein the switching logic to store a subordinate bus identifier and a subordinate device identifier for the endpoint.

Example 12: The device according to Examples 1 to 11, wherein the device comprises additional downstream ports directly connected to respective additional endpoints and wherein the switching logic to store a respective unique combination of a secondary bus identifier and a secondary device identifier for respective ones of the additional endpoints.

Example 13: The device according to Examples 1 to 12, wherein the device comprises additional downstream ports directly connected to respective additional endpoints and wherein the switching logic to store a same secondary bus identifier for multiple endpoints of the additional endpoints.

Example 14: A system comprising: a host to assign a bus identifier and a device identifier to an endpoint; and a switch comprising: an upstream port to connect with the host via an upstream peripheral component interconnect express (PCIe)-compliant connection; a downstream port to directly connect with the endpoint via a downstream PCIe-compliant connection; and a switching logic to: store the bus identifier and the device identifier assigned to the endpoint by the host; and switch data between the host and the endpoint at least partially responsive to both the stored bus identifier and the device identifier of the endpoint.

Example 15: The system according to Example 14, wherein the switching logic to switch data between the host and the endpoint via one or more of: the upstream port and the downstream port.

Example 16: The system according to Examples 14 and 15, wherein the switching logic to provide, to the host, a functionality indicator indicative of a switching functionality of the downstream port of the device and wherein the host to assign the bus identifier and the device identifier to the endpoint at least partially responsive to the functionality indicator.

Example 17: The system according to Examples 14 to 16, wherein the switch comprises additional downstream ports directly connected to respective additional endpoints and wherein the host to assign the same secondary bus identifier to multiple endpoints of the additional endpoints.

Example 18: The system according to Examples 14 to 17, wherein the switch comprises additional downstream ports directly connected to respective additional endpoints and wherein the host to assign a respective unique combination of a secondary bus identifier and a secondary device identifier for respective ones of the additional endpoints.

Example 19: The system according to Examples 14 to 18, comprising the endpoint.

Example 20: A method comprising: storing a bus identifier and a device identifier for an endpoint directly connected to a downstream port of a switch through a respective peripheral component interconnect express (PCIe)-compliant connection; and switching data at least partially responsive to both the stored bus identifier and the device identifier for the endpoint.

Example 21: The method according to Example 20, wherein switching data comprises switching data between the host and the endpoint.

Example 22: The method according to Examples 20 and 21, wherein switching data comprises switching data via one or more of: the upstream port and the downstream port.

Example 23: The method according to Examples 20 to 22, comprising providing, to a host connected to an upstream port of the switch through a respective PCIe-compliant connection, a functionality indicator indicative of a switching functionality of the downstream port.

Example 24: The method according to Examples 20 to 23, comprising receiving the bus identifier and the device identifier from a host connected to the upstream port through an upstream respective PCIe-compliant connection.

Example 25: The method according to Examples 20 to 24, comprising providing data from the upstream port to the downstream port at least partially responsive to a destination bus address of the data matching the stored bus identifier for the endpoint and at least partially responsive to a destination device address of the data matching the stored device identifier for the endpoint.

Example 26: The method according to Examples 20 to 25, comprising providing data from the downstream port to the upstream port, the data including a source bus address matching a bus identifier of the endpoint and a source device address matching a device identifier of the endpoint.

While the present disclosure has been with respect to certain illustrated examples, those of ordinary skill in the art will recognize and appreciate that the present invention is not so limited. Rather, many additions, deletions, and modifications to the illustrated and described examples may be made without departing from the scope of the invention as hereinafter claimed along with their legal equivalents. In addition, features from one example may be combined with features of another example while still being encompassed within the scope of the invention as contemplated by the inventor.

What is claimed is:

1. A device comprising:
an upstream port for a respective peripheral component interconnect express (PCIe)-compliant communicative connection with a host;
one or more downstream ports for a respective PCIe-compliant communicative connection with one or more multiple endpoints; and
a switching logic to:
for respective ones of the one or more multiple endpoints, store only a bus identifier and a device identifier in a combination unique to an endpoint of the one or more multiple endpoints, the combination in a two-field, bus: device format excluding a function field, wherein the bus identifier is reused for the one or more multiple endpoints that are uniquely differentiated by device identifiers; and
switch data exclusively responsive to the combination of the bus identifier and the device identifier unique to the endpoint.

2. The device of claim 1, wherein the switching logic to switch data between the host and the endpoint is at least partially responsive only to the bus identifier and the device identifier of the endpoint.

3. The device of claim 1, wherein the switching logic to switch data via one or more of: the upstream port or the one or more downstream ports.

4. The device of claim 1, wherein the switching logic to provide data from the upstream port to the one or more downstream ports is at least partially responsive only to both a destination bus address of the data matching the stored bus identifier for the endpoint and a destination device address of the data matching the stored device identifier for the endpoint.

5. The device of claim 1, wherein the switched data includes a source bus address matching the bus identifier of the endpoint and a source device address matching the device identifier of the endpoint.

6. The device of claim 1, wherein the switching logic to provide, to the host, a functionality indicator indicative of a switching functionality of the one or more downstream ports of the device.

7. The device of claim 6, wherein the device comprises further downstream ports directly connected to respective further endpoints and wherein the switching logic to provide, to the host, further functionality indicators indicative of respective switching functionalities of the respective further downstream ports.

8. The device of claim 1, wherein the switching logic to receive only the bus identifier and the device identifier for the endpoint from the host.

9. The device of claim 1, wherein the bus identifier is represented by 8 bits and the device identifier is represented by 5 bits, respectively according to a bus:device.function number format according to the PCIe specification.

10. The device of claim 1, wherein the switching logic to store a secondary bus identifier and a secondary device identifier for the endpoint.

11. The device of claim 10, wherein the switching logic to store a subordinate bus identifier and a subordinate device identifier for the endpoint.

12. The device of claim 10, wherein the device comprises further downstream ports directly connected to respective further endpoints and wherein the switching logic to store a respective unique combination of a secondary bus identifier and a secondary device identifier for respective ones of the further endpoints.

13. The device of claim 10, wherein the device comprises further downstream ports directly connected to respective further endpoints and wherein the switching logic to store a same secondary bus identifier for multiple endpoints of the further endpoints.

14. A system comprising:

a host to assign identifiers comprising bus identifiers and device identifiers, and excluding function identifiers, to respective ones of multiple endpoints, wherein the multiple endpoints are assigned a common bus identifier and respective device identifiers, the respective device identifiers being distinct from one another; and a switch comprising:

an upstream port to connect with the host via an upstream peripheral component interconnect express (PCIe)-compliant connection;

a downstream port to directly connect with the multiple endpoints via a downstream PCIe-compliant connection; and a switching logic to:

store only the bus identifier and the device identifier in a unique combination assigned to an endpoint of the multiple endpoints by the host, the unique combination in a two-field, bus:device format excluding a function field and switch data between the host and the endpoint exclusively responsive to the stored unique combination of the bus identifier and the device identifier assigned to the endpoint.

15. The system of claim 14, wherein the switching logic to switch data between the host and the endpoint via one or more of: the upstream port or the downstream port.

16. The system of claim 14, wherein the switching logic to provide, to the host, a functionality indicator indicative of a switching functionality of the downstream port of the device identifiers and wherein the host to only assign both a unique bus identifier and device identifier to the endpoint at least partially responsive to the functionality indicator.

17. The system of claim 14, wherein the switch comprises further downstream ports directly connected to respective further endpoints and wherein the host to assign the same secondary bus identifier to multiple endpoints of the further endpoints.

18. The system of claim 17, wherein the switch comprises further downstream ports directly connected to respective further endpoints and wherein the host to assign a respective unique combination of a secondary bus identifier and a secondary device identifier for respective ones of the further endpoints.

19. The system of claim 14, comprising a single endpoint.

20. A method comprising:

for respective ones of multiple endpoints, storing a combination of a bus identifier and a device identifier unique to an endpoint of the multiple endpoints directly connected to a downstream port of a switch through a respective peripheral component interconnect express (PCIe)-compliant connection, the combination in a two-field, bus:device format excluding a function field, wherein the bus identifier is reused for multiple ones of the multiple endpoints that are uniquely differentiated by device identifiers; and switching data at least partially, responsive only to the stored combination of the bus identifier and the device identifier unique to the endpoint of the one or more endpoints.

21. The method of claim 20, wherein switching data comprises switching data between a host and an endpoint of the one or more endpoints.

22. The method of claim 21, wherein switching data comprises switching data via one or more of: an upstream port or the downstream port.

23. The method of claim 20, comprising providing, to a host connected to an upstream port of the switch through a respective PCIe-compliant connection, a functionality indicator indicative of a switching functionality of the downstream port.

24. The method of claim 23, comprising receiving the bus identifier and the device identifier from a host connected to the upstream port through an upstream respective PCIe-compliant connection.

25. The method of claim 24, comprising providing data from the upstream port to the downstream port at least partially responsive to a destination bus address of the data matching the stored bus identifier for the endpoint and at least partially responsive to a destination device address of the data matching the stored device identifier for the endpoint.

26. The method of claim 25, comprising providing data from the downstream port to the upstream port, the data including a source bus address matching a bus identifier of the endpoint and a source device address matching a device identifier of the endpoint.

27. The method of claim 25, comprising automatically providing data from the downstream port to the upstream port based on a negative routing technique.

28. The device of claim 1, wherein the combination in the bus:device format excluding a function field enables compression of bus assignment by reuse of bus numbers across endpoint.

29. The system of claim 14, wherein the unique combination in the bus:device format excluding a function field enables compression of bus assignment by reuse of bus numbers across endpoint.

30. The method of claim 20, wherein the combination in the bus:device format excluding a function field enables compression of bus assignment by reuse of bus numbers across endpoint.

* * * * *